(12) United States Patent
Min et al.

(10) Patent No.: US 11,089,242 B2
(45) Date of Patent: Aug. 10, 2021

(54) RGBW IMAGE SENSOR, BINNING METHOD IN IMAGE SENSOR AND COMPUTER READABLE MEDIUM FOR PERFORMING THE METHOD

(71) Applicant: SAMSUNG ELECTRONICS CO., LTD., Suwon-si (KR)

(72) Inventors: Dong Ki Min, Seoul (KR); Moo Young Kim, Suwon-si (KR); Ji Hye Kim, Seongnam-si (KR); Jong Min You, Seongnam-si (KR); Kwang Hyun Lee, Seongnam-si (KR); Joon Hyuk Im, Seoul (KR); Seong Yeong Jeong, Suwon-si (KR); Eun Je Hyun, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/683,883

(22) Filed: Nov. 14, 2019

(65) Prior Publication Data
US 2020/0295096 A1 Sep. 17, 2020

(30) Foreign Application Priority Data
Mar. 11, 2019 (KR) .................. 10-2019-0027615

(51) Int. Cl.
*H04N 5/347* (2011.01)
*H04N 9/04* (2006.01)
*H04N 5/3745* (2011.01)

(52) U.S. Cl.
CPC ......... *H04N 5/347* (2013.01); *H04N 9/04511* (2018.08); *H04N 9/04555* (2018.08); *H04N 9/04559* (2018.08); *H04N 5/37457* (2013.01)

(58) Field of Classification Search
CPC .. H04N 9/045; H04N 9/0451; H04N 9/04515; H04N 9/04517–04519; H04N 9/0455; H04N 9/04551; H04N 9/04559; H04N 5/347
See application file for complete search history.

(56) References Cited

U.S. PATENT DOCUMENTS

| | | | |
|---|---|---|---|
| 5,323,233 A | 6/1994 | Yamagami et al. | |
| 7,593,047 B2 | 9/2009 | Funakoshi et al. | |
| 8,169,521 B2 | 5/2012 | Lee | |
| 8,525,895 B2 | 9/2013 | Cote et al. | |
| 9,521,338 B2 | 12/2016 | Vogelsang et al. | |
| 9,584,742 B2 | 2/2017 | Park et al. | |
| 9,674,469 B2 * | 6/2017 | Moriwaka | H04N 5/3698 |

(Continued)

*Primary Examiner* — Paul M Berardesca
(74) *Attorney, Agent, or Firm* — Sughrue Mion, PLLC

(57) ABSTRACT

An RGBW image sensor, a binning method in an image sensor, and a computer readable medium for performing the method are provided, and the binning method in an image sensor includes selecting one or more binning target pixels for each of a red pixel, a green pixel, a blue pixel, and a white pixel, constituting a pixel array of an RGBW image sensor with a uniform array pattern, generating binning pixel data for each of the red pixel, the green pixel, the blue pixel, and the white pixel, based on pieces of pixel data corresponding to the binning target pixel, and rearranging pixels, represented by the binning pixel data, to be equal to the entirety or a portion of the uniform array pattern and to be equally spaced apart from each other.

17 Claims, 20 Drawing Sheets

(56) References Cited

U.S. PATENT DOCUMENTS

| | | | |
|---|---|---|---|
| 2008/0130073 A1* | 6/2008 | Compton | H04N 9/04555 358/512 |
| 2008/0170137 A1* | 7/2008 | Matsumoto | H04N 5/3575 348/241 |
| 2008/0316346 A1* | 12/2008 | Watanabe | H04N 9/04511 348/294 |
| 2010/0128039 A1 | 5/2010 | Cho et al. | |
| 2013/0240710 A1 | 9/2013 | Choi | |
| 2015/0002635 A1* | 1/2015 | Kawai | H04N 9/04557 348/46 |
| 2015/0138407 A1* | 5/2015 | Kawaguchi | H04N 9/045 348/281 |
| 2015/0281608 A1* | 10/2015 | Miyahara | H04N 5/347 348/308 |
| 2015/0350575 A1* | 12/2015 | Agranov | H04N 5/369 348/302 |

\* cited by examiner

RGBW IMAGE SENSOR, BINNING METHOD IN IMAGE SENSOR AND COMPUTER READABLE MEDIUM FOR PERFORMING THE METHOD

CROSS-REFERENCE TO RELATED APPLICATION

This application claims priority from Korean Patent Application No. 10-2019-0027615 filed on Mar. 11, 2019 in the Korean Intellectual Property Office, the disclosure of which is incorporated herein by reference in its entirety.

BACKGROUND

1. Field

Apparatuses and methods consistent with one or more example embodiments relate to an RGBW image sensor, a binning method in an image sensor, and a computer readable medium for performing the method.

2. Description of Related Art

As the resolution of an image sensor increases, a size of image data generated by the image sensor increases. However, as a size of image data generated by the image sensor increases, it becomes increasingly difficult to maintain a high frame rate in a video mode, and power consumption also increases. To address such a situation, it is common to apply binning to reduce a size of image data by generating a single pixel using data of adjacent pixels.

SUMMARY

An aspect of one or more example embodiments provides a binning method in an image sensor capable of reducing a noise caused by a zigzag phenomenon, when binning is applied to an RGBW image sensor, and an RGBW image sensor performing the method.

According to an aspect of an example embodiment, there is provided a binning method in an image sensor, the binning method including: selecting one or more binning target pixels for each of a red pixel, a green pixel, a blue pixel, and a white pixel, constituting a pixel array of an RGBW image sensor with a uniform array pattern; generating binning pixel data for each of the red pixel, the green pixel, the blue pixel, and the white pixel, based on pieces of pixel data corresponding to the selected one or more binning target pixels; and rearranging pixels, represented by the binning pixel data, to be equal to an entirety or a portion of the uniform array pattern and to be equally spaced apart from each other.

According to an aspect of another example embodiment, there is provided an RGBW image sensor including: a binning target pixel selector configured to select one or more binning target pixels for each of a red pixel, a green pixel, a blue pixel, and a white pixel, constituting a pixel array having a uniform array pattern; a binning pixel data generator configured to generate binning pixel data for each of the red pixel, the green pixel, the blue pixel, and the white pixel based on pieces of pixel data corresponding to the selected one or more binning target pixels; and a rearranger configured to rearrange pixels, represented by the binning pixel data, to be equal to an entirety or a portion of the uniform array pattern and to be equally spaced apart from each other.

According to an aspect of another example embodiment, there is provided a non-transitory computer readable medium having recorded thereon a computer program code for one or more programs, executable by at least one processor for performing the binning method.

BRIEF DESCRIPTION OF DRAWINGS

The above and other aspects, features and other advantages will be more clearly understood from the following detailed description, taken in conjunction with the accompanying drawings, in which:

FIG. 5 is a view illustrating a binning method performed in a uniform RGBW pattern according to an example embodiment;

FIG. 11 is a view illustrating a binning method performed in a uniform RGBW pattern according to another example embodiment;

DETAILED DESCRIPTION

Figure 1:
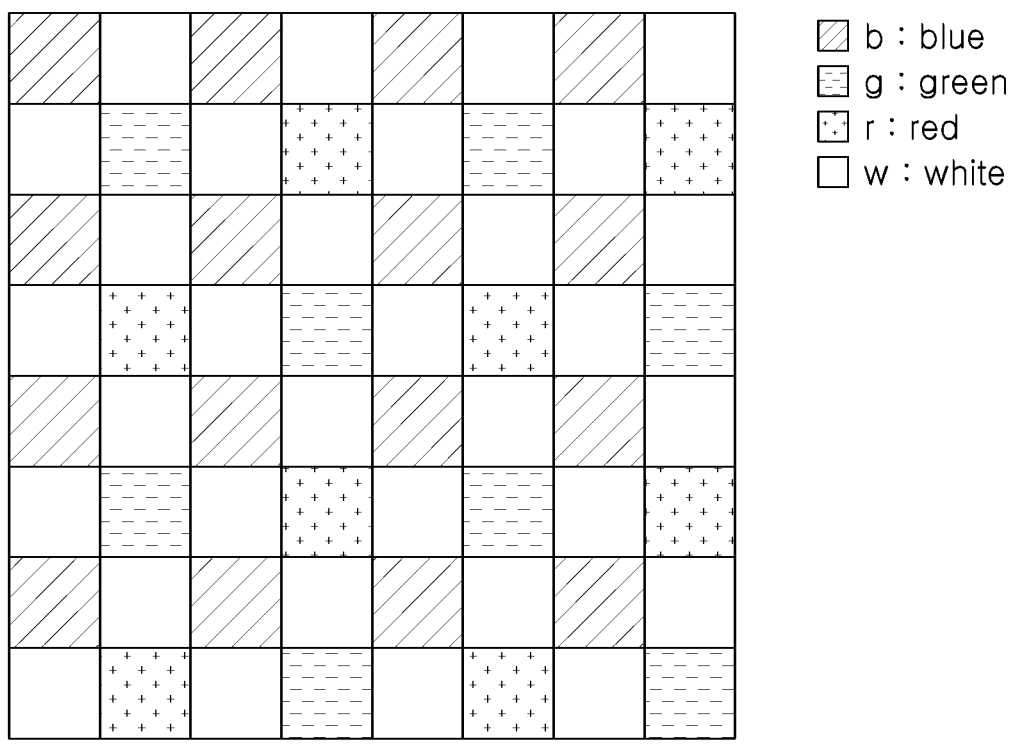
FIG. 1 is a view illustrating an example of an RGBW pattern structure.

FIG. 1 is a view illustrating an example of an RGBW pattern structure.

In order to solve a sensitivity problem caused by pixel shrink, in addition to a related art red (R), green (G), and blue (B) color filter array (CFA), as illustrated in FIG. 1, a white CFA, capable of receiving light in all bands, could also be used.

Meanwhile, an image sensor may perform binning to obtain a high-quality image such as in a video mode by using low-power, or the like. Here, even in a related art Bayer structure only using R, G, and B pixels, methods for performing binning are provided. In an example embodiment, a binning method in an RGBW image sensor using a white pixel in addition to a red pixel, a green pixel, and a blue pixel, and an RGBW image sensor performing the method, are provided.

Figure 2:
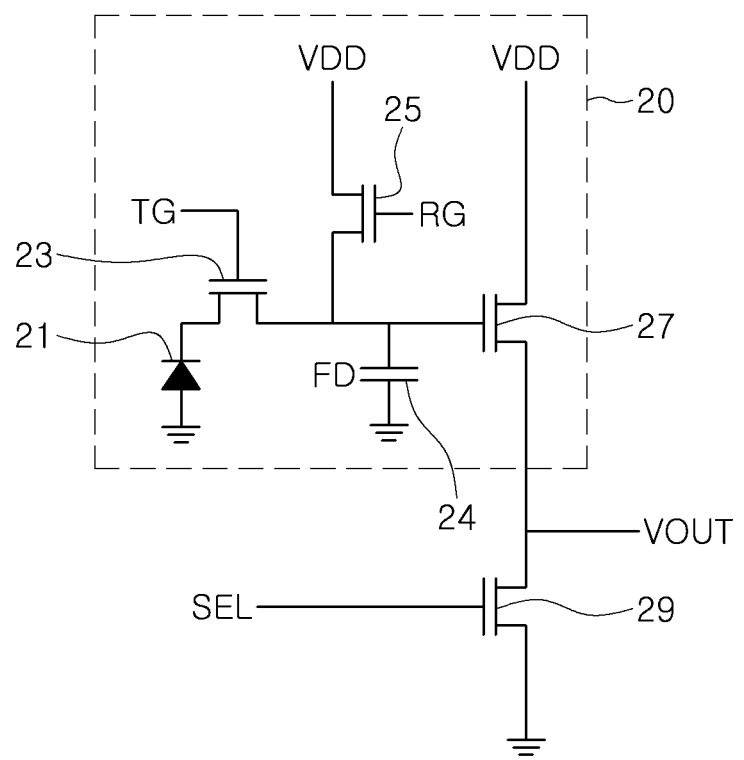
FIG. 2 is a circuit diagram illustrating an example of a unit pixel included in a pixel array.
Figure 3:
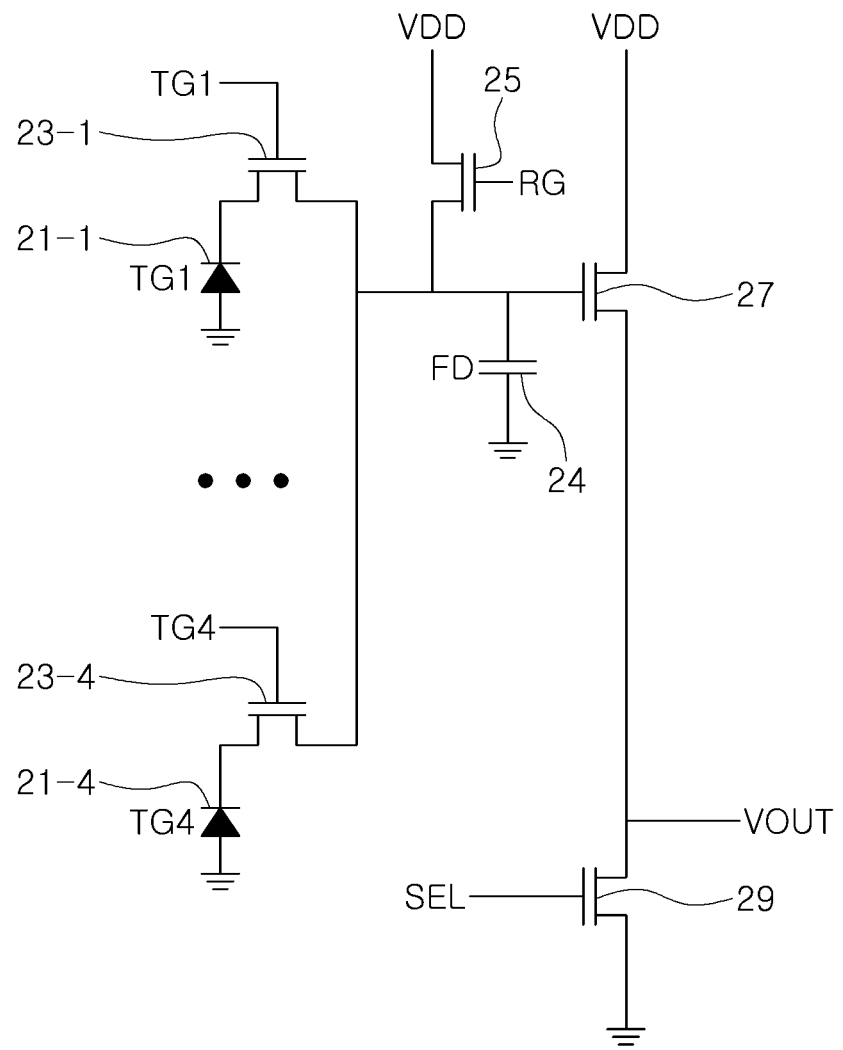
FIG. 3 is a circuit diagram provided to explain the concept of binning in an analog domain.

FIG. 2 is a circuit diagram illustrating an example of a unit pixel 20 included in a pixel array, and FIG. 3 is a circuit diagram illustrating a binning concept in an analog domain. Referring to FIG. 2, a unit pixel 20 may include a photodiode 21, a transfer transistor 23, a capacitor 24, a reset transistor 25, a sensing transistor 27, and a row select transistor 29.

In the binning in the analog domain as illustrated in FIG. 3, for low power operation when generating a video or the like, all gates of the transfer transistors 23-1 to 23-4 may be turned on in an analog domain, so electrons stored in the photodiodes 21-1 to 21-4 may be combined in the capacitor 24 and may be read by a source follower.

The binning in the digital domain may be a method in which the corresponding pixel is analog to digital converted and read, and then may be added. Here, power consumption or noise in extremely low light conditions may be high.

Figure 4:
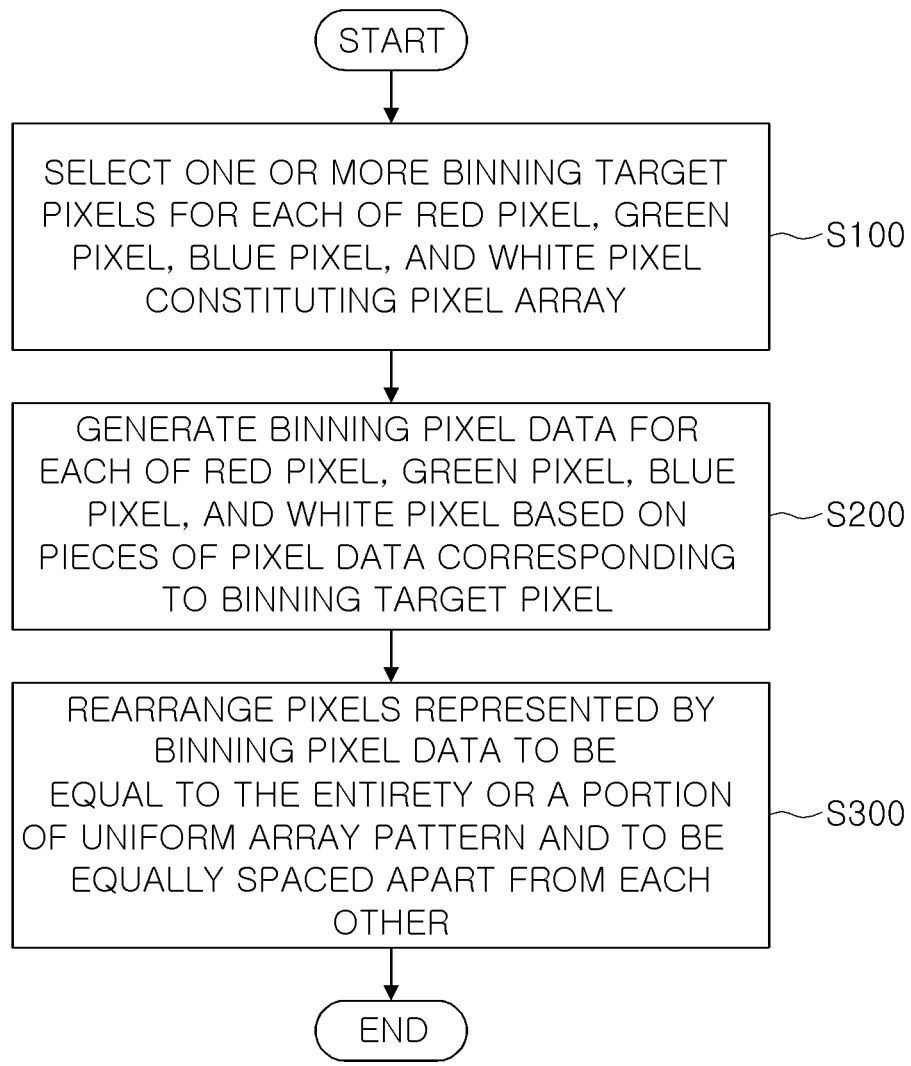
FIG. 4 is a flowchart illustrating a binning method in an image sensor according to an example embodiment.
Figure 5:
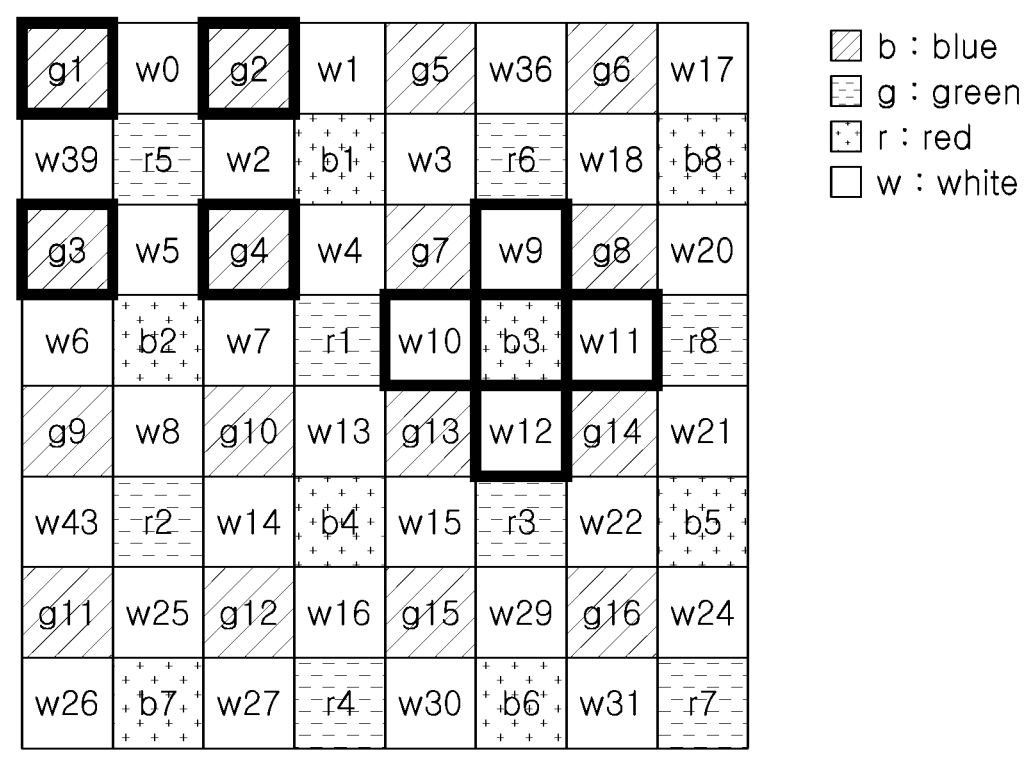
Figure 6:
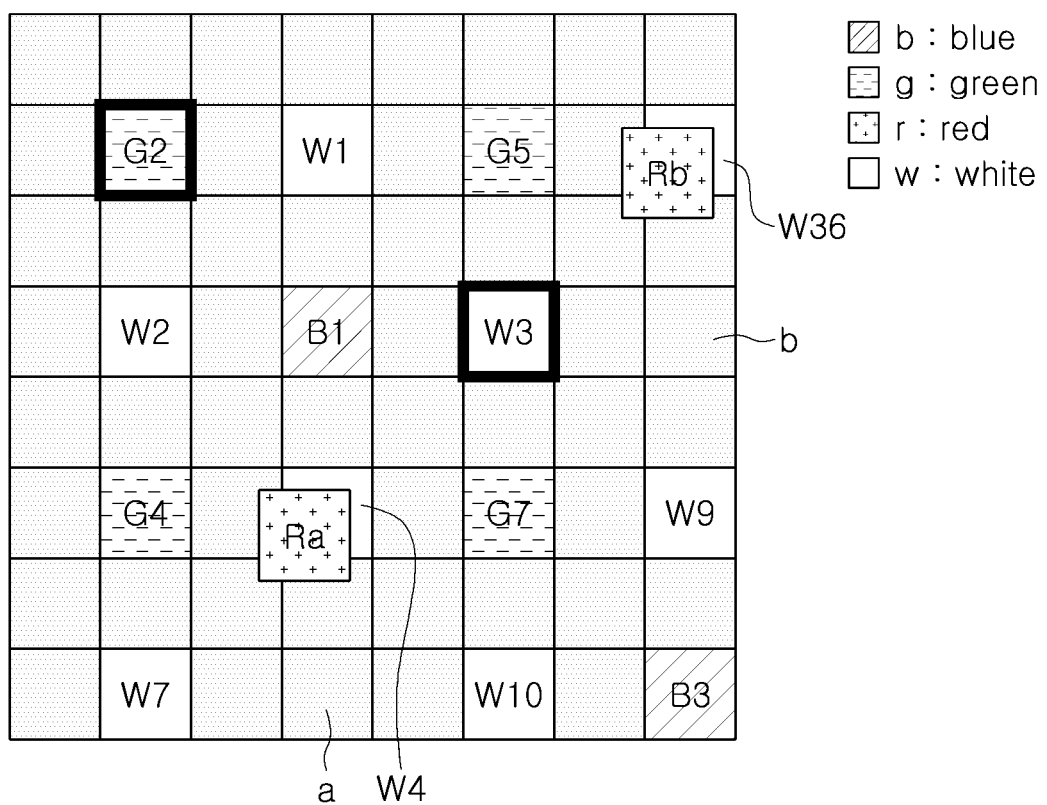
FIG. 6 is a view illustrating a result of rearrangement by applying a binning method in an image sensor, according to an example embodiment, to the RGBW pattern illustrated in FIG. 5.

FIG. 4 is a flowchart illustrating a binning method in an image sensor according to an example embodiment, FIG. 5 is a view illustrating a binning method performed in a uniform RGBW pattern according to an example embodiment, and FIG. 6 is a view illustrating a result of rearrangement by applying a binning method in an image sensor, according to an example embodiment, to the RGBW pattern illustrated in FIG. 5.

Referring to FIG. 4, a binning method in an image sensor according to an example embodiment may include selecting one or more binning target pixels for each of a red pixel, a green pixel, a blue pixel, and a white pixel, constituting a pixel array (operation S100), generating binning pixel data for each of the red pixel, the green pixel, the blue pixel, and the white pixel based on pieces of pixel data corresponding to the binning target pixel (operation S200), and rearranging pixels, represented by the binning pixel data, to be equal to the entirety or a portion of a uniform array pattern and to be equally spaced apart from each other (operation S300).

Figure 11:
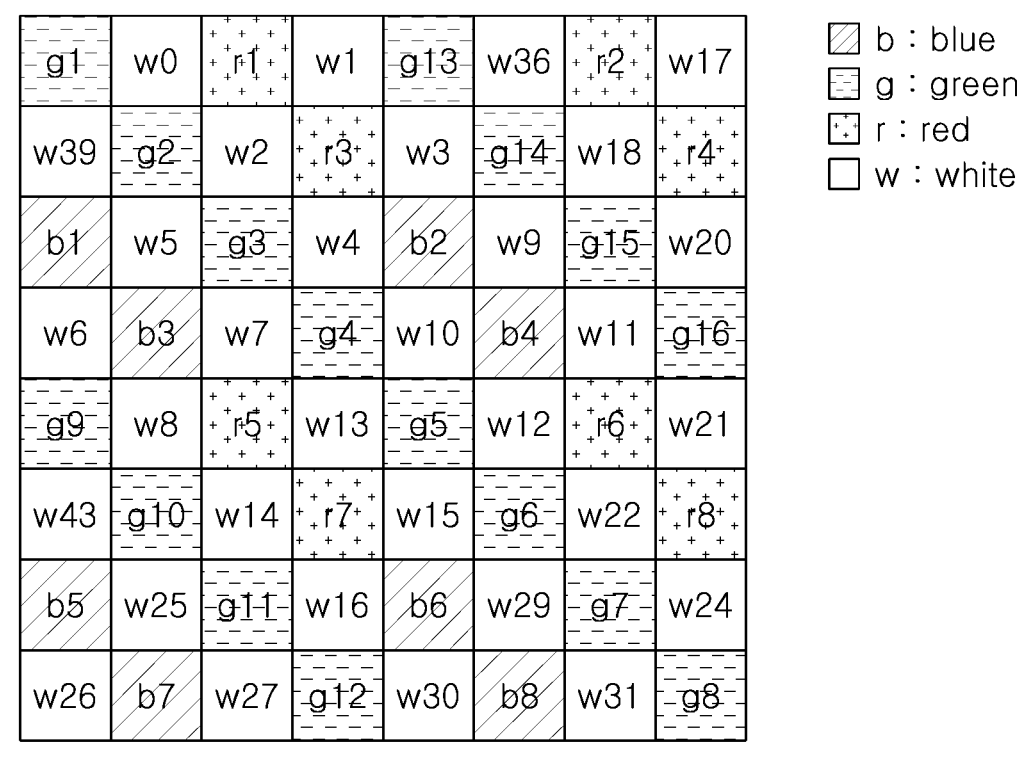

Operation S100 may be a method for selecting a binning target pixel for each of a red pixel, a green pixel, a blue pixel, and a white pixel, and any other selection method may be applied depending on which array pattern a pixel array of an image sensor has. In the present description, two array patterns (as shown in FIGS. 5 and 11) will be described by way of example, although it is understood that other array patterns may also be applied, e.g., as defined in the claims, and are considered to be within the scope of the present disclosure.

In operation S200, binning pixel data is generated for each of a red pixel, a green pixel, a blue pixel, and a white pixel based on pieces of pixel data corresponding to the binning target pixel. Here, the binning pixel data may be the arithmetic mean or sum of the pieces of pixel data.

In detail, in operation S100, when a binning target pixel selected for a particular color includes two or more binning target pixels, the arithmetic mean or sum of the pieces of pixel data corresponding to the selected binning target pixels may be obtained, and the arithmetic mean or sum thereof may be provided as binning pixel data. When a binning target pixel selected for a particular color in operation S100 is a single binning target pixel, pixel data that the corresponding pixel has may be provided as binning pixel data.

In operation S300, pixels represented by the binning pixel data are rearranged to be equal to the entirety or a portion of the uniform array pattern and to be equally spaced apart from each other. This will be described in detail below.

The RGBW pattern, illustrated in FIG. 5, may include a first row, a second row, a third row and a fourth row being sequentially arranged. The first row, the second row, the third row and the fourth row may be arranged repeatedly and sequentially adjacent to each other, in the RGBW pattern. In the first row, a green pixel, a white pixel, a green pixel, and a white pixel are sequentially arranged. In the second row, a white pixel, a red pixel, a white pixel, and a blue pixel are sequentially arranged. In the third row, a green pixel, a white pixel, a green pixel, and a white pixel are sequentially arranged. In the fourth row, a white pixel, a blue pixel, a white pixel, and a red pixel are sequentially arranged.

When pixels represented by the generated binning pixel data are rearranged in operation S300 of the binning method according to an example embodiment, all pixels may be arranged to be equal to an array pattern, which the pixel array originally has, or at least a portion of pixels are rearranged to be equal to each other, while pixels, which are newly rearranged, are required to be arranged to be equally spaced apart from each other.

In detail, as illustrated in the example of FIG. 5, when a pixel array of an image sensor has an array pattern having a first row in which a green pixel, a white pixel, a green pixel, and a white pixel are sequentially arranged, a second row in which a white pixel, a red pixel, a white pixel, and a blue pixel are sequentially arranged, a third row in which a green pixel, a white pixel, a green pixel, and a white pixel are sequentially arranged, and a fourth row in which a white pixel, a blue pixel, a white pixel, and a red pixel are sequentially arranged, the entirety or a portion of a pattern, rearranged in operation S300, may be also rearranged to have the same array pattern.

FIG. 6 illustrates a result of rearrangement by applying a binning method in an image sensor, according to an example embodiment, to the RGBW pattern illustrated in FIG. 5. Here, referring to the rearranged pattern in FIG. 6, in a first row, a green pixel G2, a white pixel W1, and a green pixel G5 may be arranged, and a white pixel W36 and a red pixel Rb are overlapped in the next pixel. In a second row, a white pixel W2, a blue pixel B1, and a white pixel W3 may be arranged, and a position b, to be filled with a next pixel, is empty. In a third row, a green pixel G4, a white pixel W4, a green pixel G7, and a white pixel W9 may be sequentially arranged, the white pixel W4 and a red pixel Ra are overlapped. In a fourth row, a white pixel W7, a white pixel W10, and a blue pixel B3 may be sequentially arranged, and a position a, in which a second pixel is located, is empty.

It may be confirmed that the pattern, rearranged as illustrated in FIG. 6, has the same pattern as the original pixel array illustrated in FIG. 5, except for at least a portion. The portion of the pattern that is not the same may be only in positions in which red and white are overlapped in the first and third rows, and positions that are empty in the second and fourth rows. Meanwhile, the remaining patterns may be the same as the array pattern that the pixel array of the original RGBW image sensor has.

In operation S100, one or more binning target pixels may be selected for each of a red pixel, a green pixel, a blue pixel, and a white pixel, constituting a pixel array. In the example embodiment illustrated in FIGS. 5 and 6, the binning target pixel for each of the green pixel, the blue pixel, and the white pixel may include four pixels having the same color, selected from the closest two or three rows in which pixels having the same color are located.

In detail, in the case of a green pixel, for example, g1, g2, g3, and g4 illustrated in FIG. 5 may be selected as a single binning target pixel group, and binning may be performed.

A binning performance result of the four pixels having the same color, g1, g2, g3, and g4 is illustrated as G2 in FIG. 6. Moreover, g5, g6, g7, and g8 illustrated in FIG. 5 may be selected as another binning target pixel group, and binning may be performed. A binning performance result of the four pixels having the same color, g5, g6, g7, and g8 is illustrated as G5 in FIG. 6. In a similar manner, binning may be performed on G4 and G7.

In the case of a white pixel, for example, w1, w2, w3, and w4 illustrated in FIG. 5 may be selected as a single binning target pixel group, and binning may be performed. A binning performance result of the four pixels having the same color w1, w2, w3, and w4 is illustrated as W1 in FIG. 6. Moreover, w5, w6, w7, and w8 illustrated in FIG. 5 may be selected as another binning target pixel group, and binning may be performed. Here, a binning performance result of the four pixels having the same color w5, w6, w7, and w8 is illustrated as W2 in FIG. 6. In a similar manner, w9, w10, w11, and w12 illustrated in FIG. 5 may be selected as another binning target pixel group, and binning may be performed. Here, a binning performance result of the four pixels having the same color w9, w10, w11, and w12 is illustrated as W3 in FIG. 6. In a similar manner, binning may be performed on W9, W7, W10, and the like.

In the case of a blue pixel, for example, b1, b2, b3, and b4 illustrated in FIG. 5 may be selected as a single binning target pixel group, and binning may be performed. A binning performance result of the four pixels having the same color b1, b2, b3, and b4 is illustrated as B1 in FIG. 6. In a similar manner, binning may be performed on B3, and the like.

In the example embodiment illustrated in FIGS. 5 and 6, in rearranging pixels represented by the binning pixel data to be equal to the entirety or a portion of the uniform array pattern and to be equally spaced apart from each other (operation S300), it may be confirmed that a position in which an image, represented by binning pixel data generated based on pieces of pixel data corresponding to a binning target pixel for each of a green pixel, a blue pixel, and a white pixel, is rearranged, is a position of the center of gravity of four pixels having the same color.

However, in the example embodiment illustrated in FIGS. 5 and 6, a result of a rearrangement of operation S300 may not be completely the same as an array pattern of a pixel array of an original image sensor. In this regard, in the case of red pixels, when a rearrangement position may be arranged as a position of the center of gravity of four pixels having the same color in the same manner as a binning method for each of a green pixel, a blue pixel, and a white pixel, the position to be arranged may not be the same as a position of a or b in FIG. 6, as intended. In detail, in FIG. 5, a position of the center of gravity of four red pixels r1, r2, r3, and r4 may overlap a position in which a pixel indicating binning result data for a pixel having a different color is placed. A binning performance result of the red pixels r1, r2, r3, and r4 may be placed in a of FIG. 6. However, if the binning performance result is rearranged to a position of the center of gravity of the four red pixels r1, r2, r3, and r4, it may overlap not a but a position of W4 in FIG. 6.

However, as described above, even when a result of a rearrangement operation may not be completely the same as an array pattern of a pixel array of an original image sensor, rearrangement performed in operation S300 according to an example embodiment results in pixels that are equally spaced apart from each other. In this regard, a zigzag phenomenon, which may occur in the related art, may not occur. This will be described below with reference to FIGS. 13 to 15. Furthermore, even in the case of a pixel array having an array pattern illustrated in FIG. 5, an arrangement method varies so that it may be completely the same as an array pattern of a pixel array of an original image sensor. This will be described below with reference to FIG. 10.

Figure 7:
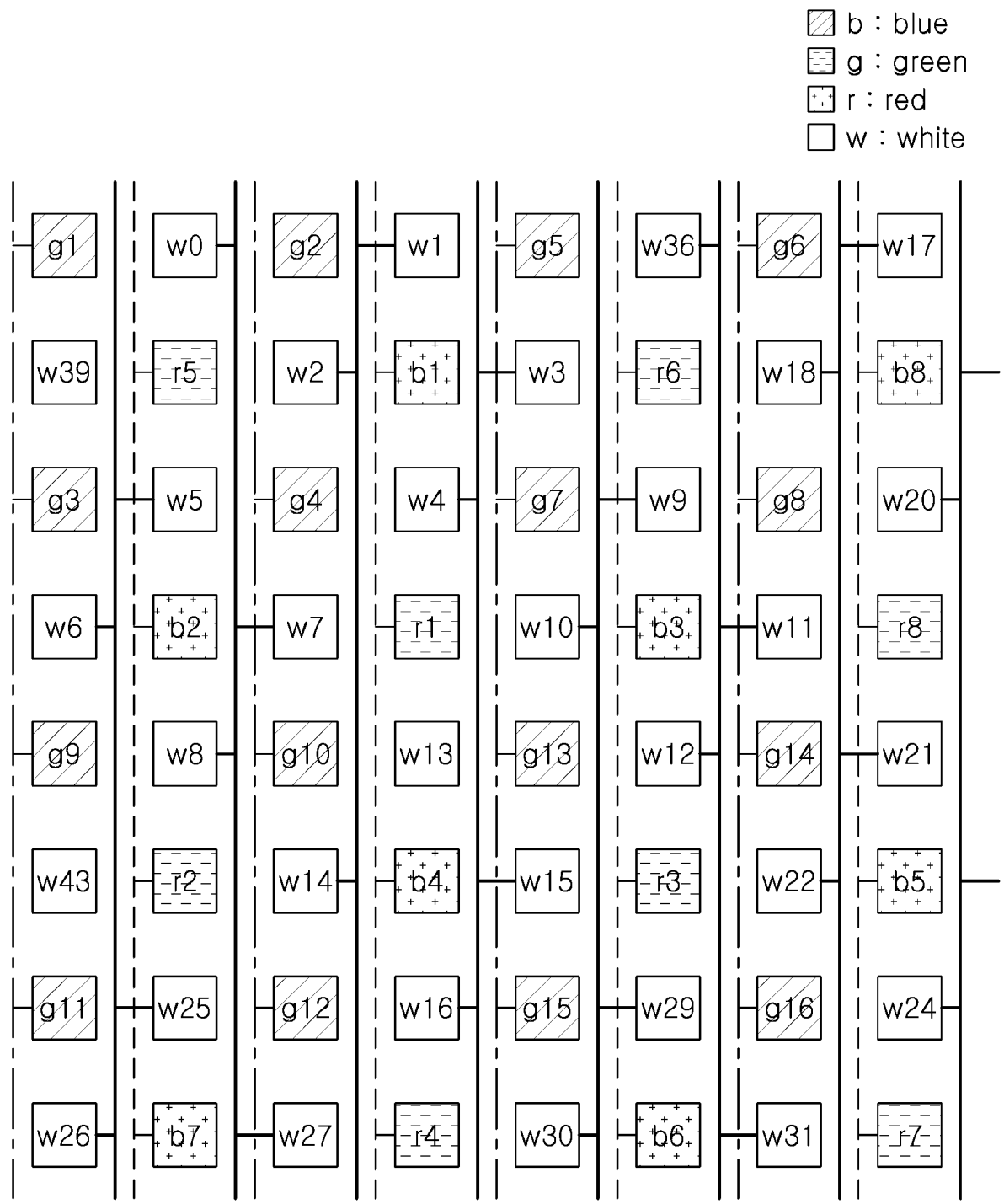
FIGS. 7 to 9 are views illustrating various example embodiments regarding a binning method of a red pixel, in a binning method in an image sensor according to an example embodiment.
Figure 8:
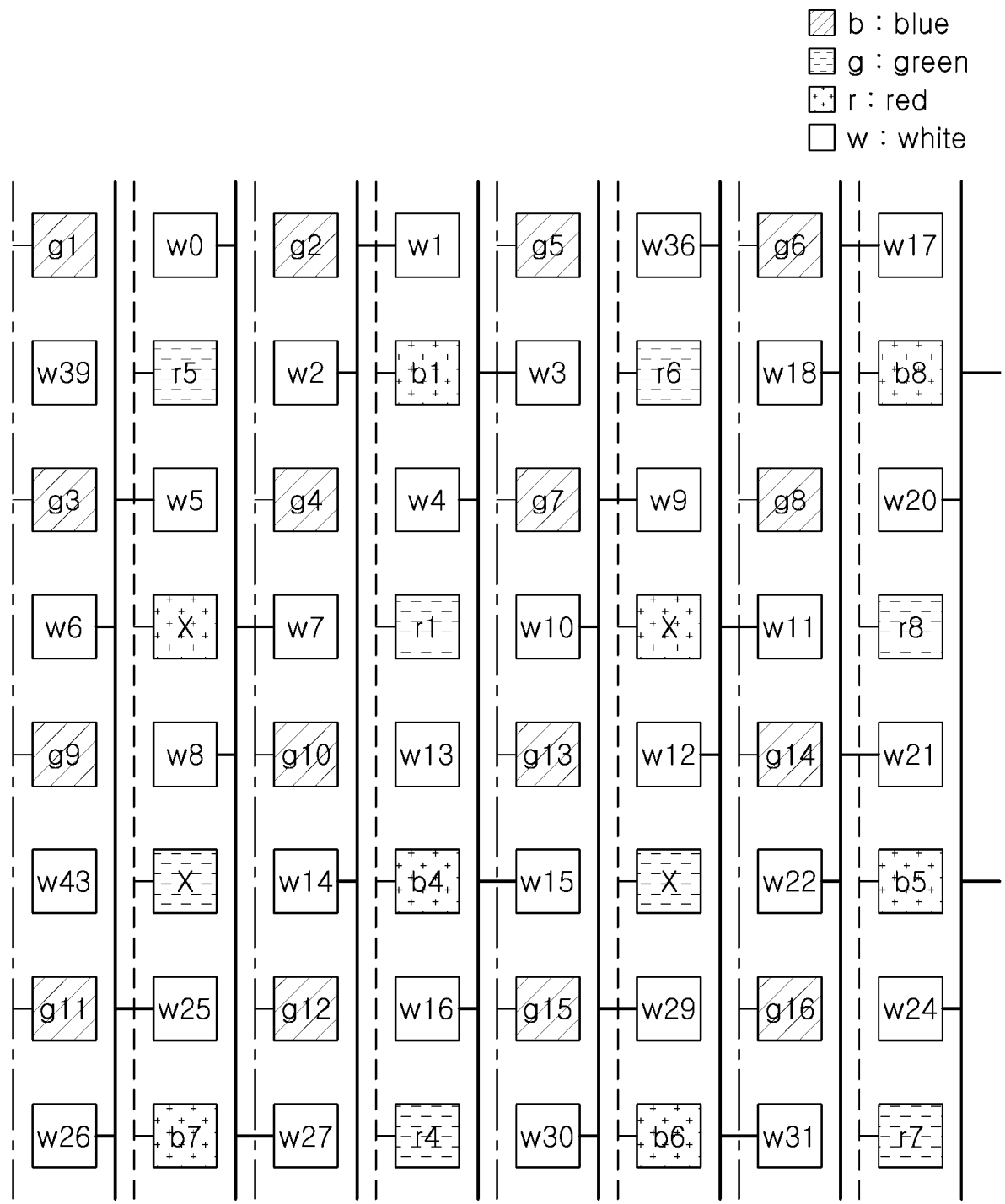
Figure 9:
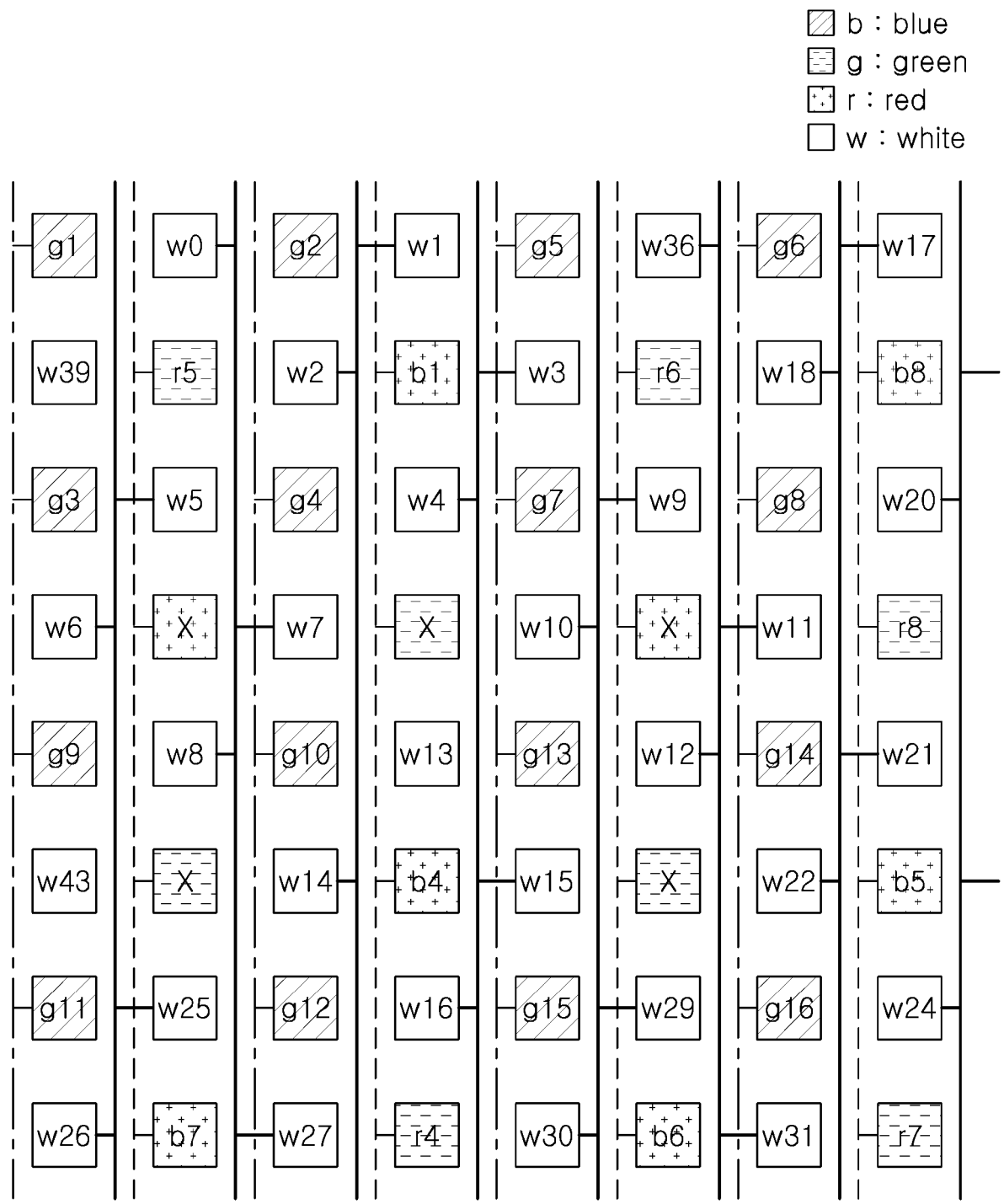
Figure 10:
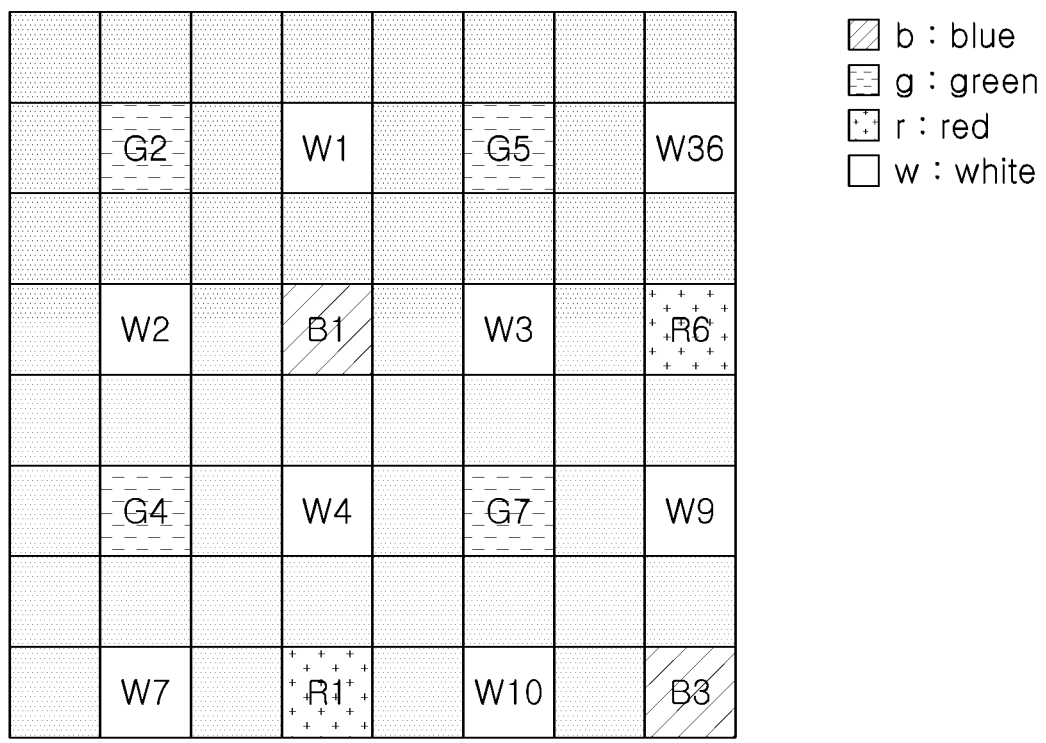
FIG. 10 is a view illustrating a result of rearrangement by applying a binning method in an image sensor according to an example embodiment illustrated in FIG. 9.

FIGS. 7 to 9 are views illustrating various example embodiments regarding a binning method of a red pixel, in a binning method in an image sensor according to an example embodiment. FIG. 10 is a view illustrating a result of rearrangement by applying a binning method in an image sensor according to an example embodiment illustrated in FIG. 9.

In operation S100 (FIG. 4), in selecting a red pixel, which is to be a target of binning, the difficulty of a circuit configuration in an analog domain may be considered. FIGS. 7 to 9 are views generalizing a state in which respective pixels are connected to each other in the analog domain, and an array pattern of a pixel is the same as the pixel array pattern illustrated in FIG. 5 by way of example.

Among FIGS. 7 to 9, FIG. 7 illustrates an example embodiment in which four pixels, that is, red pixels r1, r2, r3, and r4, are selected as a binning target pixel to generate Ra in FIG. 6. In other words, when a row in which r1 is located in FIG. 5 is referred to as a top row, a row in which r2 and r3 are located is referred to as a middle row, and a row in which r4 is located is referred to as a bottom row, four red pixels r1, r2, r3, and r4, may be selected as one from the top row, two from the middle row, and one from the bottom row, as the binning target pixel. In this case, a position in which an image, represented by binning pixel data generated based on pieces of pixel data corresponding to a binning target pixel for each red pixel, is rearranged, may be a position of the center of gravity of four red pixels as described above.

On the other hand, r2 and r3 may not be easily bundled together with r1 and r4 as a single binning target pixel group considering the difficulty of the analog circuit configuration. Thus, in operation S100, two red pixels, selected as one from the top row and one from the bottom row, may be selected as the binning target pixel for a red pixel. For example, in selecting the binning target pixel for a red pixel from an array pattern in the example embodiment illustrated in FIG. 5, as illustrated in FIG. 8 except for red pixels r2 and r3, red pixels r1 and r4 may be only selected, and binning may only be performed on the two red pixels so that Ra may be generated. Moreover, in this case, a position in which an image Ra, represented by binning pixel data generated based on pieces of pixel data corresponding to the binning target pixel for each red pixel, is rearranged, may be an intermediate position of the two red pixels.

Furthermore, as illustrated in FIG. 9, among a top row, a middle row, and a bottom row, a single red pixel selected from the bottom row may be selected as the binning target pixel for a red pixel. In this case, a position in which an image, represented by binning pixel data generated based on pieces of pixel data corresponding to the binning target pixel for a red pixel, is rearranged, may be the same as a position of a red pixel. In other words, among four red pixels r1, r2, r3, and r4, r4, selected from the bottom row, may be the only one selected as the binning target pixel. In this case, a position, in which an image Ra represented by binning pixel data generated based on pieces of pixel data for r4, is rearranged, may be the same as a position of r4. In this case, a pixel array having an array pattern illustrated in FIG. 5 is arranged as an array pattern illustrated in FIG. 10, and the array pattern illustrated in FIG. 10 may have an array pattern completely the same as an array pattern constituting an original pixel array.

In summary, in selecting one or more binning target pixels for each of a red pixel, a green pixel, a blue pixel, and a white pixel constituting a pixel array (operation S100), the binning target pixel for a red pixel may be a red pixel selected from one or more among the closest three rows in which a red pixel is located.

Figure 13:
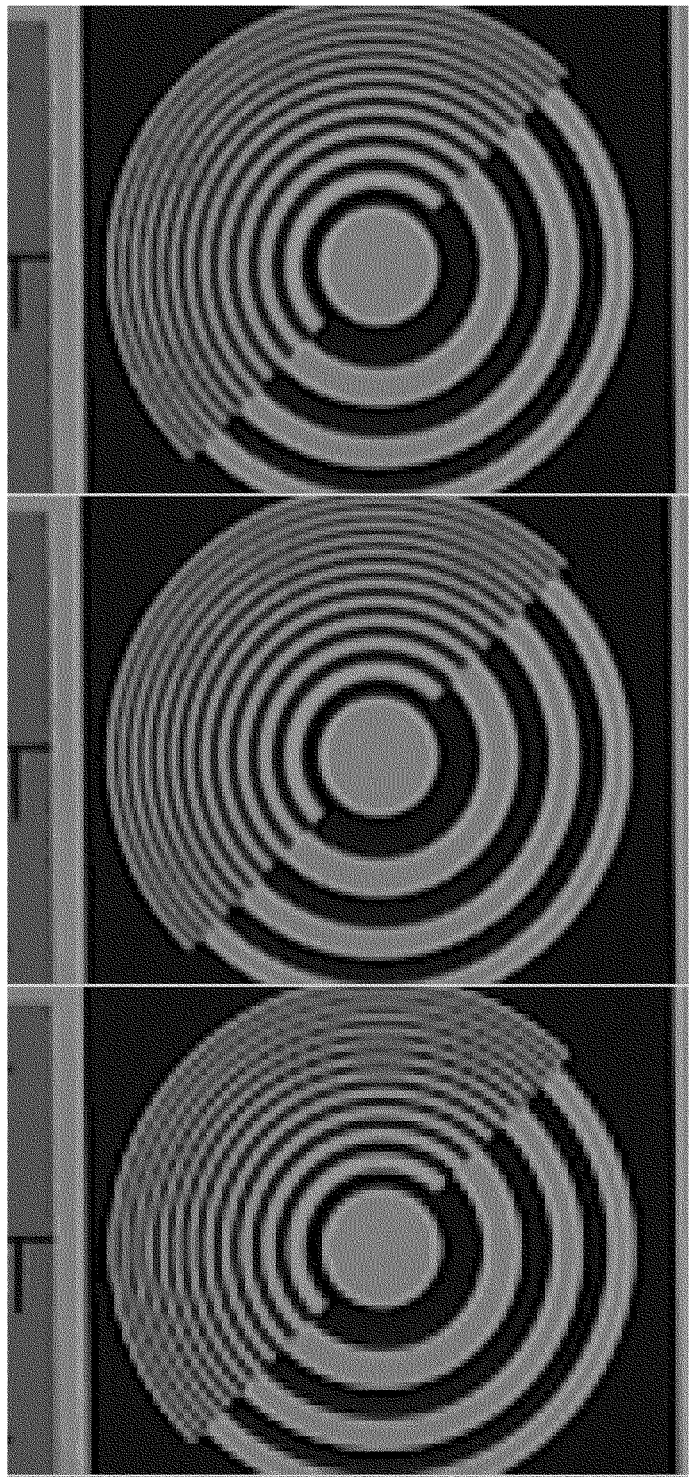
FIGS. 13 to 15 are views illustrating an effect of applying a binning method in an image sensor according to example embodiments.
Figure 14:
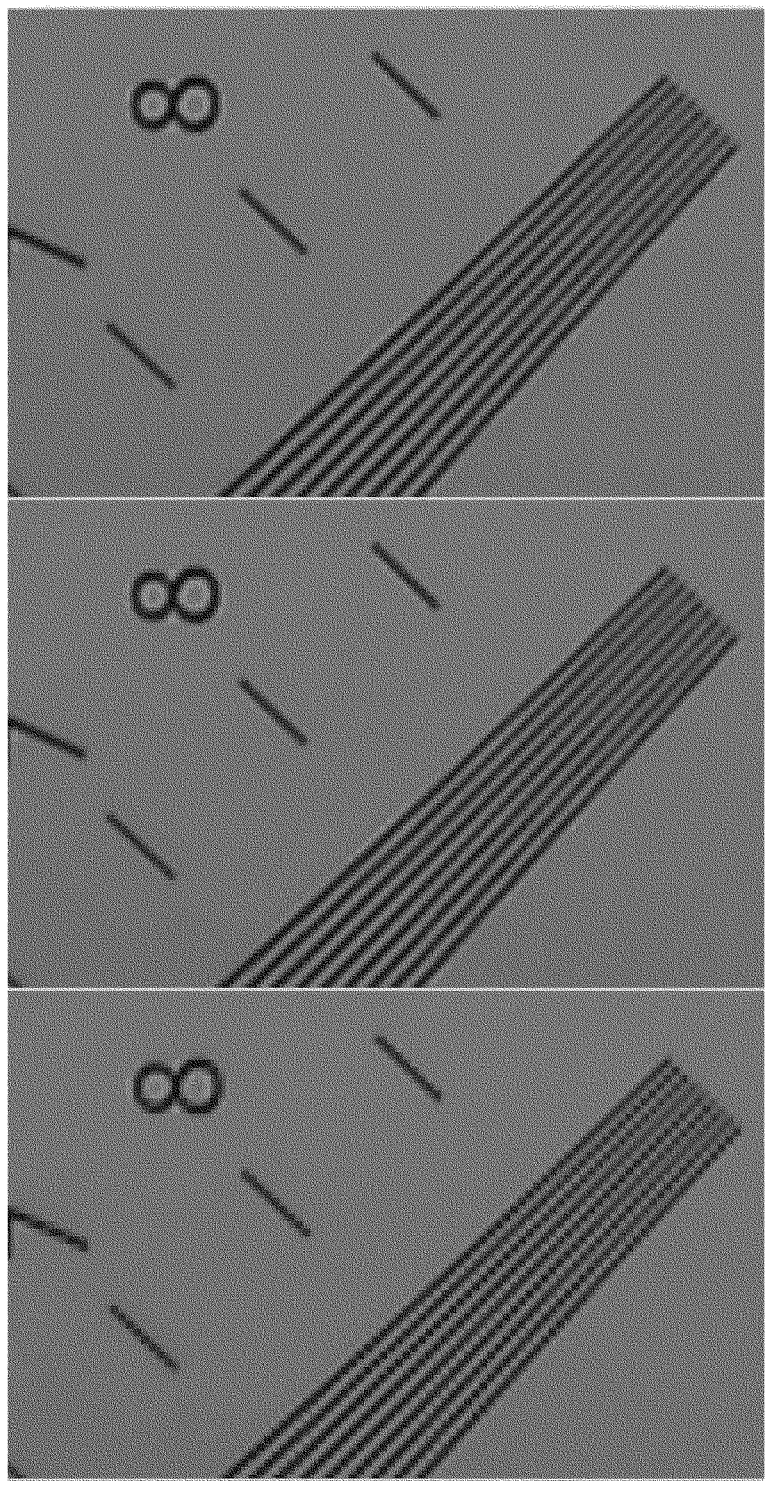
Figure 15:

FIGS. 13 to 15 are views illustrating an effect of applying a binning method in an image sensor according to an example embodiment. Leftmost drawings in each of FIGS. 13 to 15 commonly illustrate a result of performing binning in an RGB pattern according to the related art, center drawings in each of FIGS. 13 to 15 illustrate a binning performance result according to the example embodiment illustrated in FIG. 7, and rightmost drawings in each of FIGS. 13 to 15 illustrate a binning performance result according to the example embodiment illustrated in FIG. 8.

According to a result of performing binning in an RGB pattern according to the related art, as illustrated in the leftmost drawings in each of FIGS. 13 to 15, due to a problem such as a noise caused by a zigzag phenomenon, it may be commonly confirmed that an image quality is degraded as compared to the center drawings and rightmost drawings in each of FIGS. 13 to 15. On the other hand, a result of performing binning by selecting four red pixels as a binning target pixel as illustrated in FIG. 7 and a result of performing binning by selecting two red pixels as a binning target pixel as illustrated in FIG. 8 are compared with each other. As a result of the comparison, there is no significant difference as is confirmed through the center drawings and rightmost drawings in each of FIGS. 13 to 15.

Figure 12:
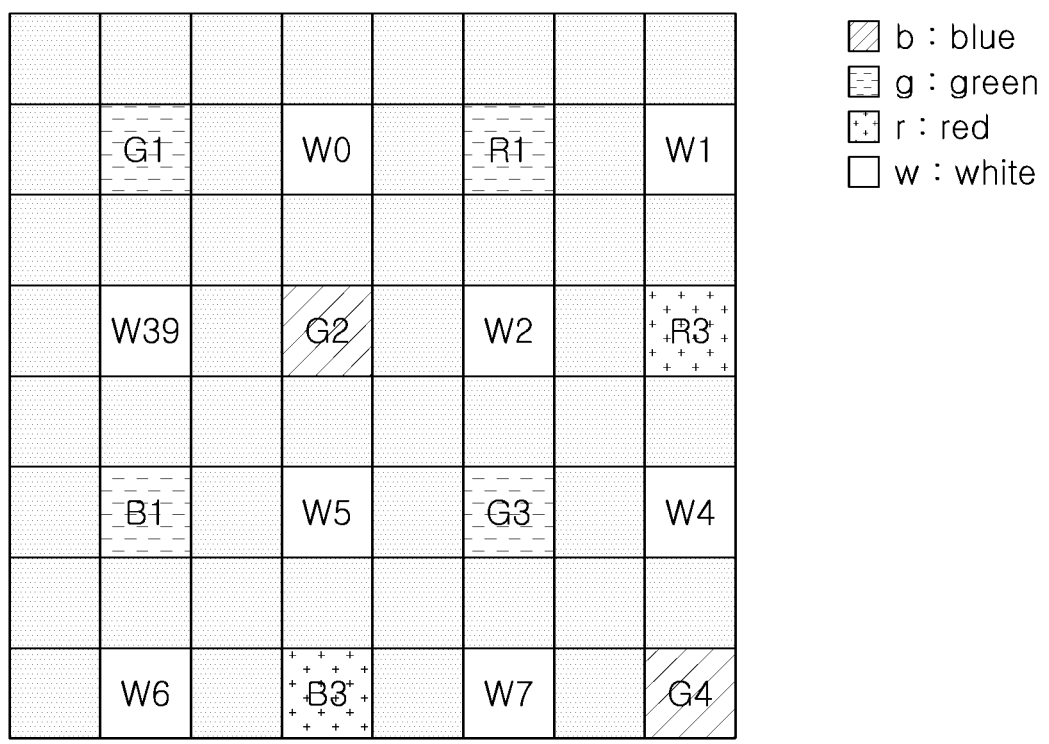
FIG. 12 is a view illustrating a result of rearrangement by applying a binning method in an image sensor, according to an example embodiment, to the RGBW pattern illustrated in FIG. 11.

FIG. 11 is a view illustrating a binning method performed in a uniform RGBW pattern according to another example embodiment, and FIG. 12 is a view illustrating a result of rearrangement by applying a binning method in an image sensor, according to an example embodiment, to the RGBW pattern illustrated in FIG. 11.

The RGBW array pattern illustrated in FIG. 11 is different from the array pattern illustrated in FIG. 5. In detail, a first row in which a green pixel, a white pixel, a red pixel, and a white pixel are sequentially arranged, a second row in which a white pixel, a green pixel, a white pixel, and a red pixel are sequentially arranged, a third row in which a blue pixel, a white pixel, a green pixel, and a white pixel are sequentially arranged, and a fourth row in which a white pixel, a blue pixel, a white pixel, and a green pixel are sequentially arranged, may be disposed sequentially and repeatedly.

As a result of performing binning on a pixel array having an array pattern according to an example embodiment, rearranging operation S300 (FIG. 4) may be performed to allow the entirety or a portion to be equal to an original array pattern and to be equally spaced apart from each other.

To this end, in the rearranging pixels, represented by the binning pixel data, to be equal to the entirety or a portion of the uniform array pattern and to be equally spaced apart from each other (operation S300), a position in which images are rearranged may be determined as one among the same position in which the binning target pixel is located, a position close to a binning target pixel in a diagonal direction, and a position of the center of gravity of a plurality of binning target pixels.

In detail, in the case of a white pixel, for example, w1, w2, w3, and w4 illustrated in FIG. 11 may be selected as a single binning target pixel group, and binning may be performed. A binning performance result of the four pixels having the same color w1, w2, w3, and w4 is illustrated as W0 in FIG. 12. Moreover, w5, w6, w7, and w8 illustrated in FIG. 11 may be selected as another binning target pixel group, and binning may be performed. Here, a binning performance result of the four pixels having the same color w5, w6, w7, and w8 is illustrated as W39 in FIG. 12. In a similar manner, w9, w10, w11, and w12 illustrated in FIG. 11 may be selected as another binning target pixel group, and binning may be performed. Here, a binning performance result of the four pixels having the same color w9, w10, w11, and w12 is illustrated as W2 in FIG. 12. In a similar manner, binning may be performed on W4, W5, W6, W7, and the like. A position to which images are rearranged after binning is performed on a white pixel in an array pattern, according to an example embodiment, may be a position of the center of gravity of a plurality of binning target pixels.

In the case of a green pixel, for example, g1, g2, and g3 illustrated in FIG. 11 may be selected as a single binning target pixel group, and binning may be performed. A binning performance result of the three pixels having the same color, g1, g2, and g3 is illustrated as G1 in FIG. 12. Moreover, g5, g6, and g7 illustrated in FIG. 11 may be selected as a single binning target pixel group, and binning may be performed. Here, a binning performance result of the three pixels having the same color, g5, g6, and g7 is illustrated as G7 in FIG. 12. In a similar manner, binning may be performed on G5, G4, and the like. A position to which images are rearranged after binning is performed on a green pixel in an array pattern, according to an example embodiment, may be the same as a position in which the selected binning target pixel is located, or a position close to the binning target pixel in a diagonal direction.

In the case of a blue pixel, for example, b5 illustrated in FIG. 11 may selected as a binning target pixel group, and binning may be performed. A binning performance result of a pixel b5 is illustrated as B1 in FIG. 12. Moreover, b6 illustrated in FIG. 11 may be selected as a binning target pixel group, and binning may be performed. Here, a binning performance result of the pixel b6 is illustrated as B3 in FIG. 12.

In the case of a red pixel, in a similar manner, for example, r2 illustrated in FIG. 11 may be selected as a binning target pixel group, and binning may be performed. A binning performance result of the pixel r2 is illustrated as R1 in FIG. 12. Moreover, r6 illustrated in FIG. 11 may be selected as a binning target pixel group, and binning may be performed. Here, a binning performance result of the pixel r6 is illustrated as R3 in FIG. 12.

A position to which images are rearranged after binning is performed on a blue pixel and a red pixel in an array pattern, according to an example embodiment, is a position close to a selected binning target pixel in a diagonal direction.

FIGS. 16 to 19 are views illustrating a binning method in an image sensor according to one or more example embodiments.

Figure 16:
FIGS. 16 to 19 are views illustrating a binning method in an image sensor according to one or more example embodiments.

First, referring to FIG. 16, a binning pixel array 40 may be generated from a pixel array 30 of an image sensor. Pixels of the pixel array 30 may be arranged in the form of RGBW. According to an example embodiment, an image sensor selects at least a portion of pixels of the pixel array 30 as binning target pixels, rearranges binning pixel data obtained from the binning target pixels, and thus constitutes the binning pixel array 40. Pixels included in the binning pixel array 40 may be arranged to have a uniform pattern.

Figure 18:
Figure 19:
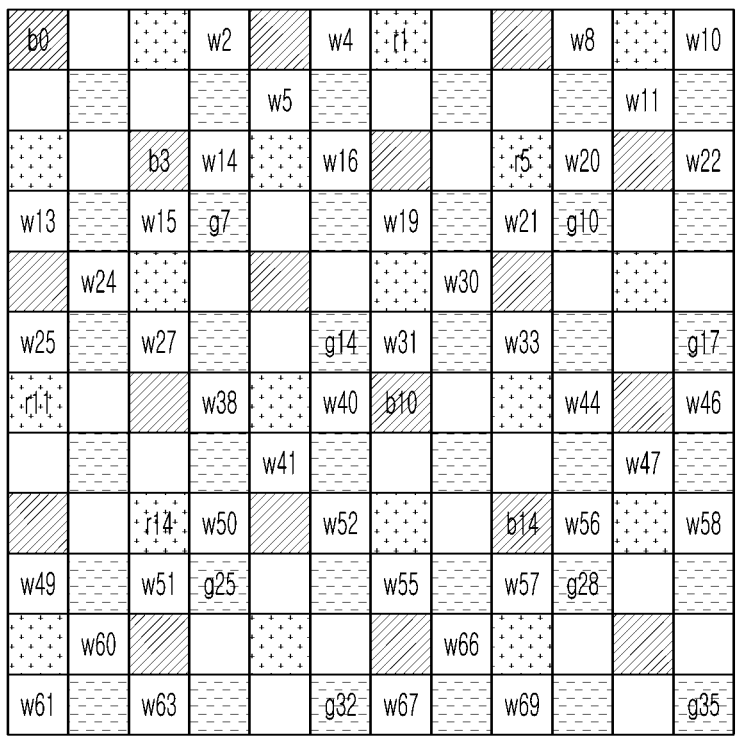
Figure 19:
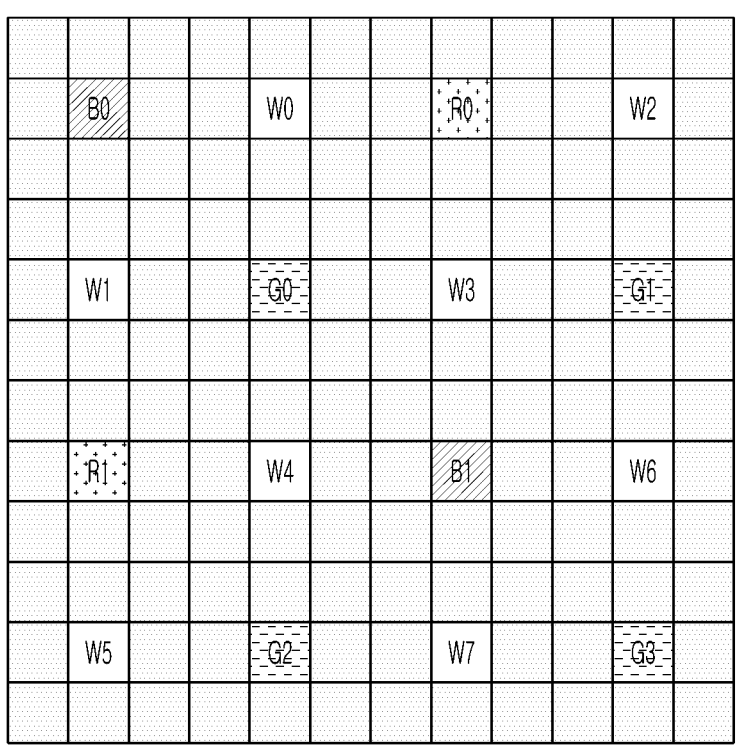

Hereinafter, referring to FIGS. 17 to 19, various example embodiments, in which binning target pixels are selected and the binning pixel array 40 is constituted, will be described. However, it is understood that the example embodiments described with reference to FIGS. 17 to 19 are merely examples, and that various modifications may be additionally derived based on aspects of the present disclosure.

Figure 17:
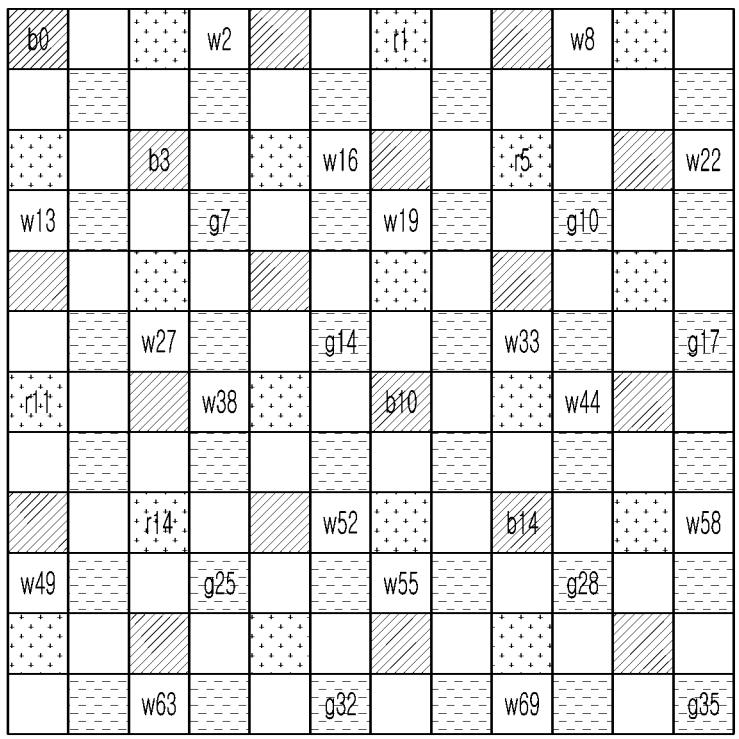
Figure 17:
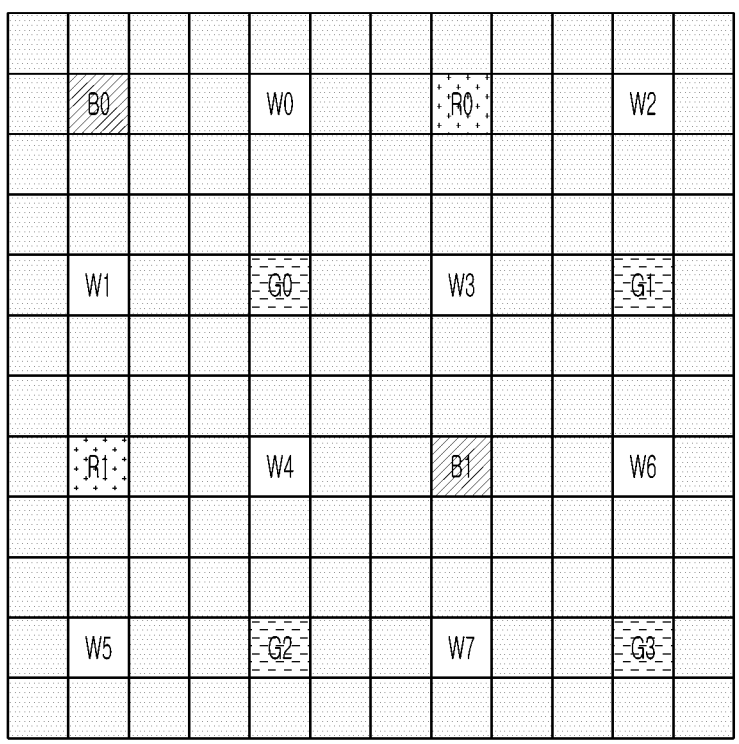

First, referring to FIG. 17, some blue pixels adjacent to each other in a diagonal direction in the pixel array 30 are selected as binning target pixels b0, b3, b10, and b14 to constitute blue pixels B0 and B1 of the binning pixel array 40. A position of each of the blue pixels B0 and B1 in the binning pixel array 40 may be a midpoint of the binning target pixels b0, b3, b10, and b14 used to constitute each of the blue pixels B0 and B1. That is, a position of the blue pixel B0 in the binning pixel array 40 may be a midpoint of the binning target pixels b0 and b3, and a position of the blue pixel B1 in the binning pixel array 40 may be a midpoint of the binning target pixels b10 and b14.

In the present example embodiment illustrated in FIG. 17, red pixels R0 and R1, green pixels G0 to G3, and white pixels W0 to W7 of the binning pixel array 40 may be constituted in a method similar to the blue pixels B0 and B1. For example, the red pixels R0 and R1 may be determined by selecting some red pixels, adjacent to each other in a diagonal direction in the pixel array 30, as binning target pixels r1, r5, r11, and r14.

Next, referring to FIG. 18, in the binning pixel array 40, blue pixels B0 and B1, red pixels R0 and R1, and green pixels G0 to G3 may be constituted in a method similar to the example embodiment described with reference to FIG. 17. However, in the example embodiment illustrated in FIG. 18, the white pixels W0 to W7 may be generated by four binning target pixels adjacent to each other in diagonal directions based on a position of each of the white pixels W0 to W7.

For example, the first white pixel W0 of the binning pixel array 40 may be constituted by four binning target pixels w2, w4, w14, and w16 adjacent to each other in diagonal directions in a position of a first white pixel W0. In a similar manner, a second white pixel W1 may be constituted by four binning target pixels w13, w15, w25, and w27 adjacent to each other in diagonal directions in a position of a second white pixel W1.

In an example embodiment illustrated in FIG. 19, blue pixels B0 and B1, red pixels R0 and R1, and green pixels G0 to G3 of the binning pixel array 40 may be formed using a method similar to the example embodiments illustrated in FIGS. 17 and 18. However, in the example embodiment illustrated in FIG. 19, white pixels W0 to W7 may be generated by binning target pixels, corresponding to a position of each of the white pixels W0 to W7, and four binning target pixels adjacent to each other in diagonal directions in a position of each of the white pixels W0 to W7. In other words, each of the white pixels W0 to W7 may be constituted by data obtained from five binning target pixels.

For example, a first white pixel W0 of the binning pixel array 40 may be constituted by a single binning target pixel w5, located in a position of a first white pixel W0, and four binning target pixels w2, w4, w14, and w16 adjacent to each other in diagonal directions in a position of the first white pixel W0. In a similar manner, a third white pixel W2 may be constituted by a single binning target pixel w11, located in a position of the third white pixel W2, and four binning target pixels w8, w10, w20, and w22 adjacent to each other in diagonal directions in a position of the third white pixel W2.

Figure 20:
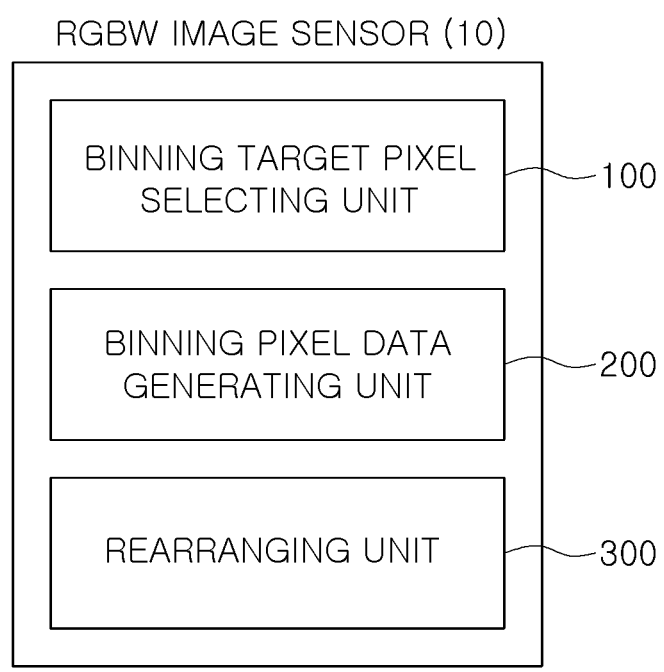
FIG. 20 is a block diagram illustrating an RGBW image sensor according to an example embodiment.

FIG. 20 is a block diagram illustrating an RGBW image sensor 10 according to an example embodiment. The RGBW image sensor 10 may include a binning target pixel selecting unit 100 (e.g., binning target pixel selector), a binning pixel data generating unit 200 (e.g., binning pixel data generator), and a rearranging unit 300 (e.g., rearranger).

The binning target pixel selecting unit 100 selects one or more binning target pixels for each of a red pixel, a green pixel, a blue pixel, and a white pixel, constituting a pixel array with a uniform array pattern.

The binning pixel data generating unit 200 generates binning pixel data for each of the red pixel, the green pixel, the blue pixel, and the white pixel based on pieces of pixel data corresponding to a binning target pixel.

The rearranging unit 300 rearranges pixels, represented by the generated binning pixel data, to be equal to the entirety or a portion of a uniform array pattern while being equally spaced apart from each other.

The operation(s) of the binning target pixel selecting unit 100 corresponds to operation S100 in FIG. 4 and the corresponding description, the operation(s) of the binning pixel data generating unit 200 corresponds to operation S200 in FIG. 4 and the corresponding description, and the operation(s) of the rearranging unit 300 corresponds to operation S300 in FIG. 4 and the corresponding description. Thus, specific technical explanations and effects of the binning target pixel selecting unit 100, the binning pixel data generating unit 200, and the rearranging unit 300 may be understood with reference to FIGS. 4 to 15 and the corresponding parts of the detailed description, and therefore, a redundant description thereof will be omitted here to avoid repetition.

It is understood that the term "unit," as used in this description, refers to software and/or hardware components, such as a field programmable gate array (FPGA), or an application specific integrated circuit (ASIC), and the unit performs certain functions. However, a unit is not limited to software or hardware. A unit may be configured to be on an addressable storage medium or configured to be executed by one or more processors. Thus, as an example, a unit includes components, such as software components, object-oriented software components, class components, and task components, as well as processes, functions, attributes, procedures, subroutines, segments of a program code, drivers, firmware, microcodes, circuits, data, databases, data structures, tables, arrays, and variables. The functionality, provided within the components and units, may be combined into a smaller number of components and units, or further separated into additional components and units. In addition, components and units may be implemented to execute on one or more processors, e.g., central processing units (CPUs) in the device.

Moreover, according to one or more example embodiments, as a computer readable medium including a computer program code for one or more programs, a computer program code included in a computer readable medium may be configured to perform a binning method in an image sensor according to operation S100 to operation S300, described in FIG. 4 and the corresponding description, by at least one processor.

As set forth above, when binning is applied in an RGBW image sensor according to example embodiments, a binning method in an image sensor according to example embodiments, and a computer readable medium for performing the method, a noise caused by a zigzag phenomenon may be reduced.

While example embodiments have been shown and described above, it will be apparent to those skilled in the art that modifications and variations could be made without departing from the scope of the present disclosure, as defined by the appended claims.

What is claimed is:

1. A binning method in an image sensor, comprising:
   selecting one or more binning target pixels for each of a red pixel, a green pixel, a blue pixel, and a white pixel, constituting a pixel array of an RGBW image sensor with a uniform array pattern;
   generating binning pixel data for each of the red pixel, the green pixel, the blue pixel, and the white pixel, based on pieces of pixel data corresponding to the selected one or more binning target pixels; and
   rearranging pixels, represented by the binning pixel data, to be equal to an entirety or a portion of the uniform array pattern and to be equally spaced apart from each other,
   wherein the rearranged pixels comprise red, green, blue, and white pixels,
   in the rearranging the pixels, a position in which the pixels are rearranged is determined as one among a same position as a position in which the binning target pixel is located, a position close to the binning target pixel in a diagonal direction, and a position of the center of gravity of a plurality of binning target pixels;
   the uniform array pattern is an array pattern in which a first row, a second row, a third row and a fourth row are sequentially arranged; and
   a green pixel, a white pixel, a green pixel, and a white pixel are sequentially arranged in the first row, a white pixel, a red pixel, a white pixel, and a blue pixel are sequentially arranged in the second row, a green pixel, a white pixel, a green pixel, and a white pixel are sequentially arranged in the third row, and a white pixel, a blue pixel, a white pixel, and a red pixel are sequentially arranged in the fourth row.

2. The binning method according to claim 1, wherein, in the selecting the one or more binning target pixels, the one or more binning target pixels for each of the green pixel, the blue pixel, and the white pixel includes four pixels having a same color, selected from a closest two rows or a closest three rows in which pixels having the same color are located.

3. The binning method according to claim 2, wherein, in the rearranging the pixels, a position in which an image, represented by binning pixel data generated based on pieces of pixel data corresponding to a binning target pixel for each of the green pixel, the blue pixel, and the white pixel, is rearranged is a position of a center of gravity of the four pixels having the same color.

4. The binning method according to claim 1, wherein, in the selecting the one or more binning target pixels, a binning target pixel for the red pixel is a red pixel selected from one or more among a closest three rows in which a red pixel is located.

5. The binning method according to claim 4, wherein the binning target pixel for the red pixel includes four red pixels selected as one from a top row of the closest three rows, two from a middle row of the closest three rows, and one from a bottom row of the closest three rows.

6. The binning method according to claim 5, wherein, in the rearranging the pixels, a position in which an image, represented by binning pixel data generated based on pieces of pixel data corresponding to a binning target pixel for each of the red pixels, is rearranged, is a position of a center of gravity of the four red pixels.

7. The binning method according to claim 4, wherein the binning target pixel for the red pixel includes two red pixels selected as one from a top row of the closest three rows and one from a bottom row of the closest three rows.

8. The binning method according to claim 7, wherein, in the rearranging the pixels, a position in which an image, represented by binning pixel data generated based on pieces of pixel data corresponding to a binning target pixel for each of the red pixels, is rearranged is an intermediate position of the two red pixels.

9. The binning method according to claim 4, wherein the binning target pixel for the red pixel includes a single red pixel selected from a bottom row of the closest three rows.

10. The binning method according to claim 9, wherein, in the rearranging the pixels, a position in which an image, represented by binning pixel data generated based on pieces of pixel data corresponding to a binning target pixel for the red pixel, is rearranged is a same position as a position of the single red pixel.

11. The binning method according to claim 1, wherein in the generating the binning pixel data, the binning pixel data is an arithmetic mean or sum of the pieces of the pixel data.

12. A binning method in an image sensor, comprising:
    selecting one or more binning target pixels for each of a red pixel, a green pixel, a blue pixel, and a white pixel, constituting a pixel array of an RGBW image sensor with a uniform array pattern;
    generating binning pixel data for each of the red pixel, the green pixel, the blue pixel, and the white pixel, based on pieces of pixel data corresponding to the selected one or more binning target pixels; and
    rearranging pixels, represented by the binning pixel data, to be equal to an entirety or a portion of the uniform array pattern and to be equally spaced apart from each other,
    wherein the rearranged pixels comprise red, green, blue, and white pixels,
    in the rearranging the pixels, a position in which the pixels are rearranged is determined as one among a same position as a position in which the binning target pixel is located, a position close to the binning target pixel in a diagonal direction, and a position of the center of gravity of a plurality of binning target pixels,
    the uniform array pattern is an array pattern in which a first row, a second row, a third row and a fourth row are sequentially arranged; and
    a green pixel, a white pixel, a red pixel, and a white pixel are sequentially arranged in the first row, a white pixel, a green pixel, a white pixel, and a red pixel are sequentially arranged in the second row, a blue pixel, a white pixel, a green pixel, and a white pixel are sequentially arranged in the third row, and a white pixel, a blue pixel, a white pixel, and a green pixel are sequentially arranged in the fourth row.

13. The binning method according to claim 12, wherein, in the selecting the one or more binning target pixels, a binning target pixel for the white pixel includes four white pixels selected from a closest two rows in which pixels having a same color are located.

14. The binning method according to claim 13, wherein in the rearranging the pixels, a position in which an image, represented by binning pixel data generated based on pieces of pixel data corresponding to a binning target pixel for the white pixel, is rearranged is a position of a center of gravity of the four white pixels.

15. The binning method according to claim 14, wherein, in the rearranging the pixels, a position in which an image, represented by binning pixel data generated based on pieces of pixel data corresponding to a binning target pixel for each of a green pixel, a blue pixel, and a red pixel, is rearranged is a position separated from a position of the center of gravity of the white pixel by a single pixel distance in a vertical direction or a horizontal direction.

16. The binning method according to claim 15, wherein in the selecting the one or more binning target pixels, a binning target pixel for each of the green pixel, the blue pixel, and the red pixel is one or two pixels having a same color, selected from a pixel located in an immediate vicinity in a diagonal direction based on a position in which an image, represented by binning pixel data generated based on pieces of pixel data corresponding to a binning target pixel for each of the green pixel, the blue pixel, and the red pixel, is rearranged.

17. An RGBW image sensor, comprising:
- a binning target pixel selector configured to select one or more binning target pixels for each of a red pixel, a green pixel, a blue pixel, and a white pixel, constituting a pixel array having a uniform array pattern;
- a binning pixel data generator configured to generate binning pixel data for each of the red pixel, the green pixel, the blue pixel, and the white pixel based on pieces of pixel data corresponding to the selected one or more binning target pixels; and
- a rearranger configured to rearrange pixels, represented by the binning pixel data, to be equal to an entirety or a portion of the uniform array pattern and to be equally spaced apart from each other, wherein the rearranged pixels comprise red, green, blue, and white pixels, the rearranger determines a position in which the pixels are rearranged as one among a same position as a position in which the binning target pixel is located, a position close to the binning target pixel in a diagonal direction, and a position of the center of gravity of a plurality of binning target pixels, the uniform array pattern is an array pattern in which a first row, a second row, a third row and a fourth row are sequentially arranged; and a green pixel, a white pixel, a green pixel, and a white pixel are sequentially arranged in the first row, a white pixel, a red pixel, a white pixel, and a blue pixel are sequentially arranged in the second row, a green pixel, a white pixel, a green pixel, and a white pixel are sequentially arranged in the third row, and a white pixel, a blue pixel, a white pixel, and a red pixel are sequentially arranged in the fourth row.

* * * * *